United States Patent [19]

Shubow

[11] Patent Number: 4,865,894

[45] Date of Patent: Sep. 12, 1989

[54] LAMINAR WALL PANEL

[76] Inventor: Calvin Shubow, 30205 Summit, Apt. 206, Farmington Hills, Mich. 48018

[21] Appl. No.: 107,686

[22] Filed: Oct. 13, 1987

[51] Int. Cl.$^4$ ................................................ B32B 3/30
[52] U.S. Cl. ...................................... 428/59; 428/60; 428/161; 428/163
[58] Field of Search ...................... 428/57–60, 428/161, 162–164

[56] References Cited

U.S. PATENT DOCUMENTS

| Re. 26,239 | 7/1967 | Rockahard et al. | 428/60 X |
| 1,610,581 | 12/1926 | O'Shaughnessy | 428/161 X |
| 2,122,479 | 7/1938 | Sondorn | 428/163 X |
| 2,680,698 | 6/1954 | Schnee | 428/60 X |
| 3,582,095 | 6/1971 | Bagaert | 428/162 X |
| 4,234,634 | 11/1980 | Longinotti | 428/163 X |

FOREIGN PATENT DOCUMENTS

| 218971 | 11/1958 | Australia | 428/163 |
| 485363 | 5/1938 | United Kingdom | 428/161 |

Primary Examiner—Nancy A. B. Swisher
Attorney, Agent, or Firm—Krass & Young

[57] ABSTRACT

A wall panel and a method of forming the panel. The panel includes an outer concrete layer, an inner concrete layer, and a central insulation layer positioned between the concrete layers. The inboard vertical faces of the inner and outer concrete layers have laterally spaced vertical ribs in confronting relation to each other and the central insulation layer includes laterally spaced vertical grooves on each vertical side face thereof sized and configured to nestingly receive the ribs on the inboard faces of the inner and outer concrete layers. A reinforcing rod structure of ladder configuration serves to tie the layers together with one vertical stile of each ladder construction embedded in the outer concrete layer, the other vertical stile of the ladder structure embedded in the inner concrete layer, and the rungs interconnecting the stiles extending between the confronting ribs through the central insulation layer. A method of forming the wall panel is also disclosed.

12 Claims, 3 Drawing Sheets

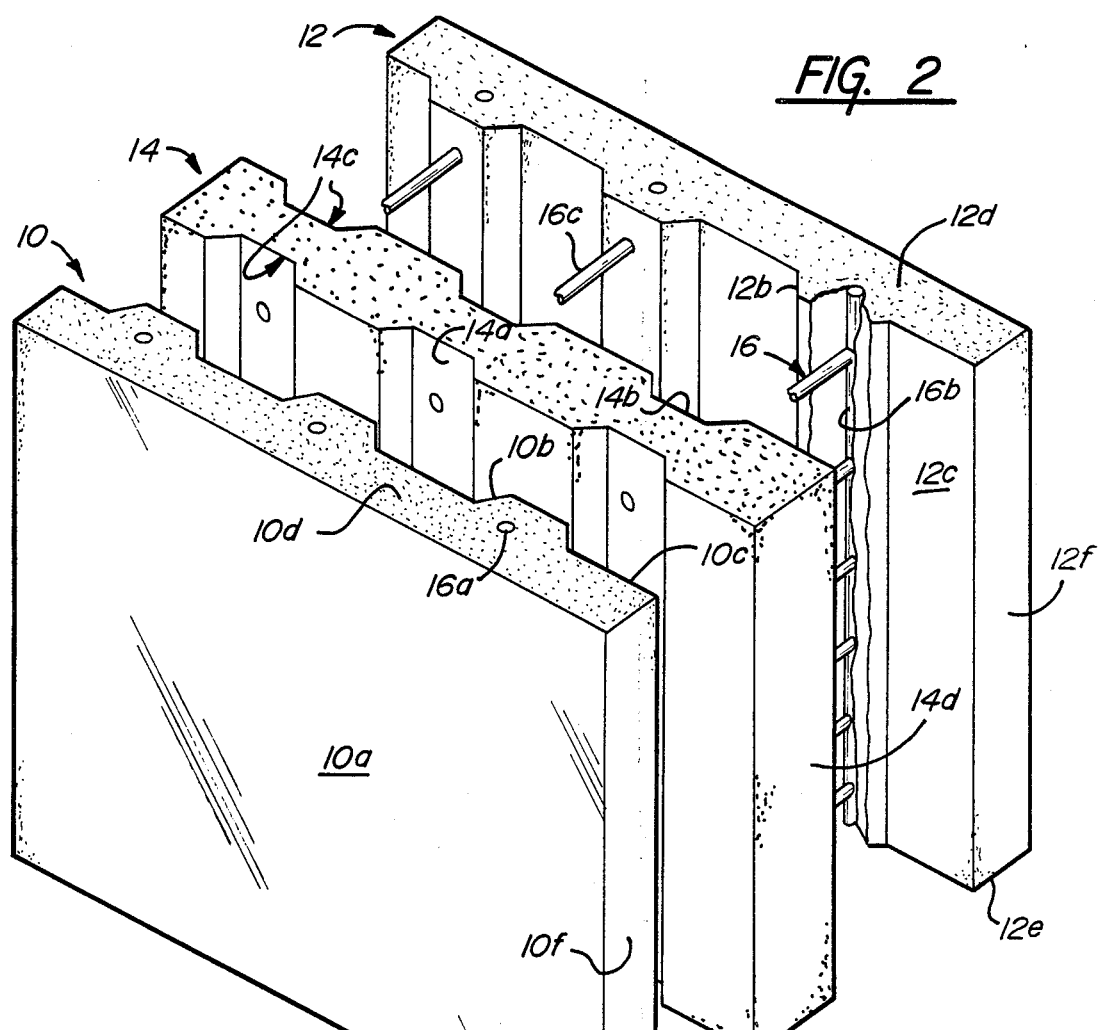
FIG. 2
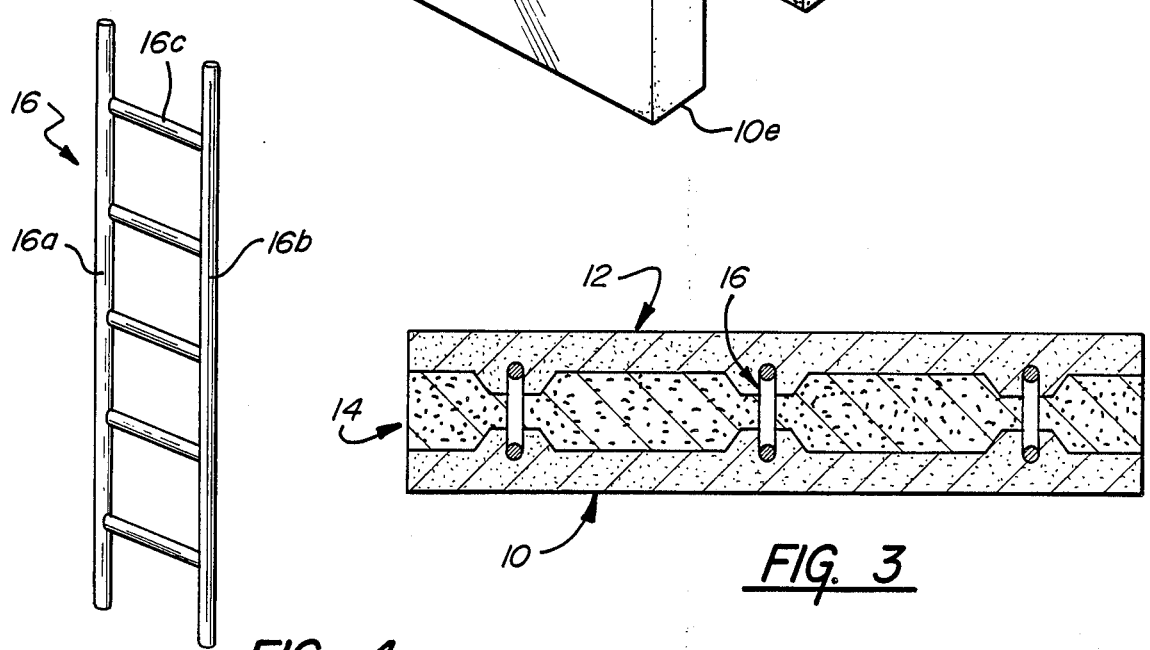
FIG. 4
FIG. 3

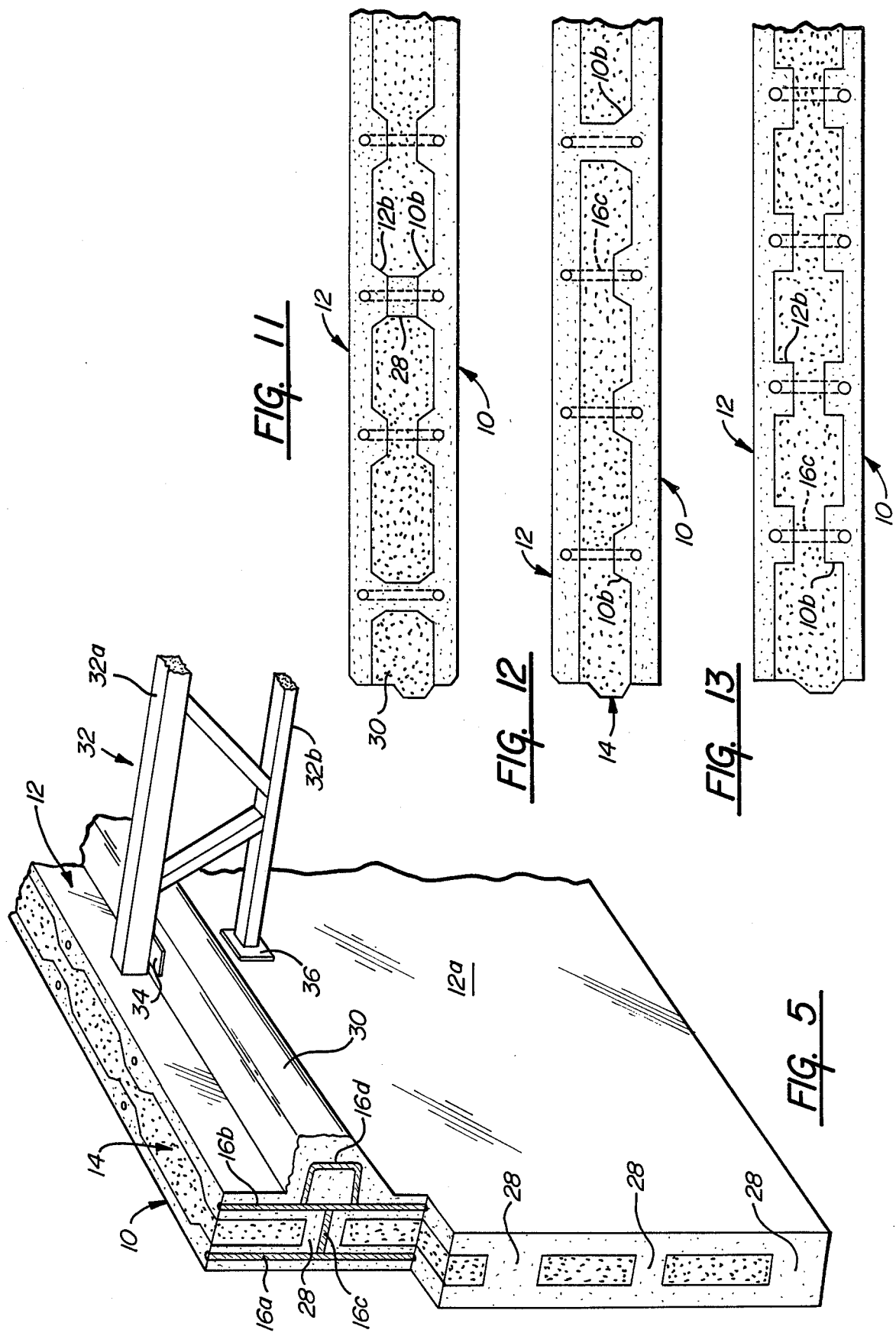

LAMINAR WALL PANEL

This invention relates to building construction and more particularly to a building construction including modular wall panels.

A common form of modern building construction is the steel frame construction in which columns and beams of structural steel are assembled into a framework which supports the weight of the walls, floors and other components of the building which are secured to the framework. Such construction is relatively expensive due to the high cost of structural steel and requires relatively expensive on-site labor for the installation of the walls and ceiling panels to the steel framework.

In an effort to reduce the cost of building construction, it has been proposed to utilize preformed modular wall panels. One such preformed modular wall panel comprises a solid concrete slab. Such slabs, however, are unduly heavy and therefore difficult to handle in the process of erecting the building. Solid concrete slabs are also relatively expensive. It has further been proposed to utilize laminar modular wall panels of a sandwich construction including, for example, inner and outer concrete layers with a central insulation layer and with reinforcing structure extending between the inner and outer layers. These laminar panels, however, have also proven to be relatively heavy and also relatively expensive. It has further been proposed to utilize hollow core wall panels having a solid concrete slab construction with tubular cores running in parallel fashion from top to bottom of the panel. However, these hollow core panels are also relatively expensive, and are also relatively heavy and therefore difficult to handle during the erection process.

SUMMARY OF THE INVENTION

The present invention is directed to the provision of an improved modular wall panel.

More specifically, the present invention is directed to the provision of a modular wall panel which provides an optimum combination of lightweight, low cost, and high structural strength.

The invention is further directed to the provision of a method of forming a low cost, lightweight, and high strength wall panel.

The wall panel according to the invention includes a first concrete layer having laterally spaced vertical ribs on its inboard face; a second concrete layer having an inboard face confronting but spaced transversely from the first concrete layer; and a layer of insulation material positioned between the concrete layers and having laterally spaced vertical grooves on one vertical face thereof sized and configured to nestingly receive the ribs in the first concrete layer. This arrangement minimizes the volume and weight of concrete utilized in the panel so as to minimize the weight and expense of the panel and yet retains a relatively high panel strength by virtue of the rib construction.

According to a further feature of the invention, the panel further includes reinforcing rods extending transversely in the panel from the first concrete layer to the second concrete layer through the insulation layer. These reinforcing rods add significantly to the structural strength of the panel without adding significantly to the cost or weight of the panel.

According to a further feature of the invention, each of the reinforcing rods extends from a rib on one concrete layer and through the insulation layer to the second concrete layer. This arrangement anchors the reinforcing rods in the ribs on the first concrete layer to further optimize the strength of the wall panel.

According to a further feature of the invention, the second concrete layer also includes laterally spaced ribs on its inboard vertical face respectively confronting the ribs on the inboard vertical face of the first concrete layer, and laterally spaced grooves are provided on the other vertical face of the insulation layer sized and configured to nestingly receive the ribs on the second concrete layer. This arrangement adds further to the beam strength of the panel without adding significantly to the weight or cost of the panel.

According to a further feature of the invention, the reinforcing rods extend between a rib on the first concrete layer and through the insulation layer to the confronting rib on the other concrete layer. This specific arrangement maximizes the compressive and bending strength of the panel.

According to a further feature of the invention, the reinforcing rods are part of a ladder reinforcing rod structure including stile rod portions extending vertically in each of the concrete layers and rung portions extending through the insulation layer between the concrete layers. This arrangement allows the reinforcing rod ladder to rigidly and positively secure the laminar construction together.

According to a further feature of the invention, the confronting ribs on the first and second concrete layers are joined at at least one lateral location along the panel to form a solid concrete interconnection between the first and second concrete layers. This arrangement allows the panel to be locally strengthened at selective locations along the panel by forming a solid concrete construction at these selective laterally spaced locations.

According to the methodology of the invention, the wall panel is formed by forming a first elongated layer of concrete on a suitable bed; placing first insulation members on the first concrete layer with longitudinally spaced gaps between the members extending across the width of the first concrete layer; filling the gaps with further concrete to form ribs extending across the width of the first layer of concrete at longitudinally spaced locations; laying a second elongated further insulation member over the first insulation members and over the upper faces of the ribs; and forming a second concrete layer on top of the second insulation member. This methodology provides an effective and inexpensive means of forming the wall panel of the invention.

According to a further feature of the invention methodology, the reinforcing rods are formed into longitudinally spaced ladder structures; one stile of each ladder structure is positioned in a gap between successive first insulation members and vertically extending rungs are secured to the stile prior to the filling of the gaps with concrete; the rungs are extended through the second insulation member as the second insulation member is positioned over the first insulation members and over the upper faces of the ribs; and the other stile of each ladder structure is secured to the upper ends of the rungs prior to forming the second layer of concrete on top of the second insulation member. This arrangement assures that the upper and lower stiles of the reinforcing ladder structures are embedded respectively in the upper and lower concrete layers to maximize the strength and rigidity of the panel.

BRIEF DESCRIPTION OF THE DRAWING

FIG. 2 is an exploded perspective view of the invention wall panel;

FIG. 3 is a cross sectional view taken on line 3—3 of FIG. 1;

FIG. 4 is a perspective view of a ladder reinforcing rod structure employed in the invention wall panel;

FIG. 5 is a fragmentary perspective view of a building construction utilizing the invention wall panel;

FIGS. 6, 7, 8, 9 and 10 show steps in the formation of the invention wall panel; and FIGS. 11, 12 and 13 show alternate constructions for the invention wall panel.

DETAILED DESCRIPTION OF THE PREFERRED EMBODIMENT

Figure 1:
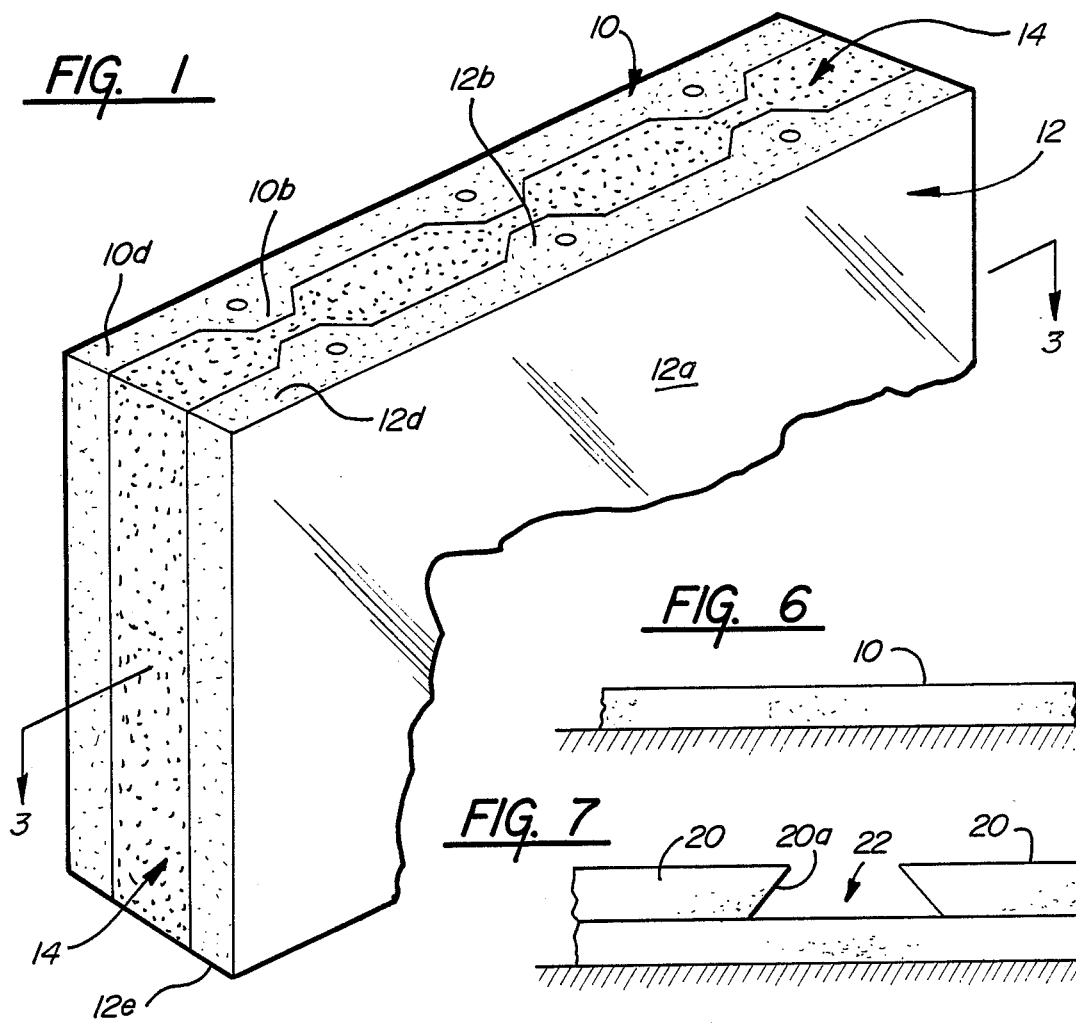
FIG. 1 is a fragmentary perspective view of a wall panel according to the invention.

The invention wall panel, broadly considered, includes an outer concrete layer 10, an inner concrete layer 12, a central insulation layer 14, and a plurality of reinforcing rod structures 16.

Outer concrete layer 10 and inner concrete layer 12 may be formed of any suitable concrete composition although a quick drying composition is preferred to facilitate the production process.

Outer concrete layer 10 has a flat outboard surface 10a and includes a plurality of laterally spaced vertical ribs 10b along its inboard face 10c. Ribs 10b preferably extend from the top edge 10d to the bottom edge 10e of the concrete layer and preferably have a truncated triangular cross-sectional configuration.

Inner concrete layer 12 is generally similar to outer concrete layer 10 and includes a flat outboard face 12a and a plurality of laterally spaced vertical ribs 12b along its inboard face 12c. Ribs 12b extend from the upper edge 12d to the lower edge 12e of the concrete layer, have a generally truncated triangular cross-sectional configuration, and correspond in size, configuration, and lateral spacing to the ribs 10b on the outer layer 10 so that, in the assembled relation of the layers 10, 12 and 14, ribs 10b are positioned in respective confronting relation to ribs 12b.

Insulation layer 14 is formed of a suitable insulation material such as expanded polystyrene and has an overall size and configuration generally corresponding to the overall size and configuration of concrete layers 10 and 12 so that, when the layers are sandwiched together, they coact to form a generally rectangular wall panel.

Insulation layer 14 includes a series of laterally spaced vertical grooves 14a along one side vertical face thereof and a corresponding series of laterally spaced vertical grooves 14d on the other side vertical face thereof. Grooves 14a are sized and configured to nestingly receive ribs 10b on outer concrete layer 10 and grooves 14b are sized and configured to nestingly receive ribs 12b on inner concrete layer 12 to form the nested sandwich structure best seen in FIGS. 1 and 3.

Reinforcing rod structures 16 each have a ladder configuration with vertical stiles 16a and 16b interconnected by a series of vertically spaced rungs 16c. Stiles 16a, 16b may be interconnected to rungs 16c either by welding or by the use of separate fastener or tying elements. Stiles 16a are vertically disposed in outer layer 10 in general central alignment with a rib 10b, stiles 16b are embedded in inner layer 12 in general central alignment with a rib 12b, and rungs 16 extend between stiles 16a and 16b through reduced thickness portions 14c of insulation layer 14 defined between opposite grooves 14a, 14b. Stiles 16a and 16b generally have a vertical height corresponding to the vertical height of the wall panel so that the stile rod portions run the entire vertical height of the wall panel, and the number of rungs 16c will vary depending upon the height of the panel and the structural strength desired for the panel.

The total thickness of the panel will of course vary depending on the particular intended application. For example, for many building structures, an overall panel width of eight inches may be desirable with end edges 10f and 12f of layers 10 and 12 having a thickness of one inch; edge 14d of insulation layer 14 having a thickness of six inches; grooves 14b, ribs 12b and ribs 10b each having a depth or thickness of two inches; and reduced thickness insulation portions 14c having a thickness of two inches.

A preferred method of forming the invention wall panel is seen in FIGS. 6 through 10.

In FIG. 6, the outer layer 10 of concrete is laid on a suitable bed 18 in a long continuous strip with the length of the strip varying depending upon the intended building application and depending upon the available space for forming the bed 18. Following formation of the layer 10 in a long continuous strip on the bed 18, individual pieces of insulation material 20 are positioned along the layer 10 with longitudinal gaps 22 provided between successive insulation members 20. The end edges 20a of the insulation members 20 are preferably angled so as to impart a truncated triangular configuration to the gap 22 between the successive insulation members. Thereafter, as seen in FIG. 8, a stile 16a is positioned in each gap 22, rungs 16b are suitably secured to each stile 16a, and concrete 24 is poured into the truncated triangular gap 22 to form a rib 10b on the inboard face of the outer layer 10. Thereafter, as seen in FIG. 9, a further insulation member 26, having preformed grooves 26a formed therein, is positioned over insulation members 20 and the upper surfaces of ribs 10b with rungs 16b passing in piercing fashion through the reduced thickness portions 26b of the insulation member 26. Rungs 16b may pass through preformed holes in member 26 or may forcibly pierce their way through member 26 as member 26 is positioned over insulation members 20. Thereafter, as seen in FIG. 10, stiles 16b are suitably secured to rungs 16c whereafter inner concrete layer 12 is poured over insulation member 26 to fill the grooves 26b and embed the upper ends of rungs 16c and stile 16b in the inner layer 12. Following curing of the concrete layers, the continuous laminated strip is cut transversely at longitudinally spaced locations along the strip to form a series of individual wall panels.

Alternative embodiments of the invention wall panel are seen in FIGS. 11 through 13.

With reference to FIG. 11, the wall panel shown therein includes concrete spacer members 28 positioned between opposed ribs 10b and 12b at spaced locations along the block so as to provide additional localized strength for the panel at these locations. These localized spacers 28 may comprise discrete members positioned between ribs 10b or 12b or may be cast integral with ribs 10b and 12b to provide an integral partition extending between layers 10 and 12. The concrete filler provided between ribs 10b and 12b by member 28 may extend for the full height of the panel or may interconnect the ribs only at vertically spaced locations along the height of the panel. Further, as seen in the panel of FIG. 11, the spaces provided between outer layer 10 and inner layer 12 may be filled as seen at 30 with concrete to increase the structural rigidity of the panel in the vicinity of the filled region. For example, as seen, the end of the panel may be filled as described to provide extra strength adjacent the end of the panel.

In the panel of FIG. 12, ribs 10b are provided on the inboard face of outer panel 10 but the inboard face 12a of inner panel 12 is devoid of ribs and the rungs 16c of the reinforcing ladder structures extend from a rib 10b through the insulation layer 14 and are centrally embedded in layer 12. As further seen in FIG. 12, certain of the ribs may be extended to join with inner layer 12 to form a rigid concrete partition joining the inner and outer layers to add strength to the panel in the location of the integtral partition.

The panel seen in FIG. 13 is identical to the panel disclosed in FIGS. 1 through 10 with the exception that the ribs 10b and 12b have a rectangular cross-sectional configuration rather than a truncated triangular cross-sectional configuration.

A typical application of the invention wall panel is seen in FIG. 5. In the wall panel seen in FIG. 5, spacer portions 28 are provided between ribs 10b and 12b at vertically spaced locations at the near end of the panel; the rungs 16c of the reinforcing ladder structure associated with the near end of the panel extend through the members 28; and a haunch 30 is provided on the inboard face 12a of the panel to support a plurality of joists or trusses 32 in known fashion. The reinforcing ladder structures 16 may be supplemented as seen at 16d to provide rod reinforcement for haunch 30, and weld plates 34 and 36 may be embedded in the wall panel for respective securement of the upper beam 32a and the lower beam 32b of truss 32.

The invention wall panel will be seen to provide many important advantages as compared to prior art wall panels. Specifically, because of the relatively low volume of concrete employed in the wall panel, the wall panel may be constructed at a relatively low cost and is relatively light in weight. Further, by virtue of the ribs on the inboard faces of the inner and outer layers and the interconnecting reinforcing rod structures, the panel, despite its relatively small volume of concrete, possesses great strength both in compressive and bending modes. The invention wall panel also lends itself to an inexpensive methodology which may be performed either in a plant location or at the building site. The invention wall panel construction also lends itself to ready modification to satisfy a wide variety of building requirements. Specifically, the extent to which the inner an outer concrete panels are directly interconnected and/or the extent to which the spaces between the inner and outer panels are filled with concrete can be selectively varied to selectively satisfy the specific strength requirements of the particular intended application. For example, wall panels intended for one story applications would ordinarily have a minimal amount of concrete interconnection as between the inner and outer concrete panels as would panels intended for interior application. By contrast, panels intended for multistory buildings in which further panels would be stacked on top of the lower tier of panels would have more extensive concrete interconnection as between the inner and outer concrete panels.

Whereas preferred embodiments of the invention have been illustrated and described in detail, it will be apparent that various changes may be made in the disclosed embodiments without departing from the scope or spirit of the invention.

I claim:

1. A vertical wall panel of laminar construction comprising:
    (a) a first concrete layer having laterally spaced vertical ribs on its inboard face;
    (b) a second concrete layer having an inboard face confronting but spaced transversely from said first concrete layer;
    (c) a layer of insulation material positioned between said concrete layers and having laterally spaced vertical grooves on one vertical face thereof sized and configured to nestingly receive said ribs on said first concrete layer;
    (d) transverse reinforcing rods extending transversely in said panel from said first concrete layer to said second concrete layer through said insulation layer with each transverse reinforcing rod having its opposite ends embedded in a respective concrete layer; and
    (e) vertical reinforcing rods extending vertically in, and embedded in, one of said concrete layers with at least certain of said vertical reinforcing rods having portions thereof positioned proximate a portion of a transverse reinforcing rod.

2. A wall panel according to claim 1 wherein:
    (f) each of said transverse reinforcing rods extends from a rib on said one concrete layer and through said insulation layer to said second concrete layer.

3. A wall panel according to claim 1 wherein:
    (f) said second concrete layer includes laterally spaced vertical ribs on its inboard vertical face respectively confronting said ribs on said inboard vertical face of said first concrete layer; and
    (g) laterally spaced grooves are provided on the other vertical face of said insulation layer sized and configured to nestingly receive said ribs on said second concrete layer.

4. A wall panel according to claim 3 wherein:
    (h) each of said reinforcing rods extends between a rib on said first concrete layer and the confronting rib on said second concrete layer.

5. A wall panel according to claim 1 wherein:
    (f) said transverse and vertical reinforcing rods are part of a ladder reinforcing rod structure including stile rod portions extending vertically in each of said concrete layers and rung portions extending through said insulation layer.

6. A wall panel according to claim 4 wherein:
    (j) said reinforcing rods are part of a ladder reinforcing rod structure including stile rod portions extending vertically in each of said concrete layers and rung portions extending through said insulation layer.

7. A wall panel according to claim 3 wherein:
    (h) each of said ribs has a truncated triangular cross sectional configuration.

8. A wall panel according to claim 1 wherein:
    (f) said first and second concrete layers have a uniform constant cross section extending from top to bottom thereof over substantially the entire width of the panel.

9. A laminated vertical wall panel comprising:
    (a) an outer concrete layer having laterally spaced vertical ribs on its inboard vertical face;

(b) an inner concrete layer spaced transversely from said outer concrete layer and having laterally spaced vertical ribs on its inboard vertical face respectively confronting said ribs on said inboard vertical face of said outer concrete layer; and
(c) a central layer of insulation material having laterally spaced grooves on both vertical faces thereof sized to receive said ribs on said inboard faces of said concrete layers and otherwise totally filling the space between said layers; and
(d) transverse reinforcing rods extending from said outer concrete layer to said inner concrete layer through said insulation layer with each transverse rod having its opposite ends embedded in a respective concrete layer.

10. A wall panel according to claim 9 wherein:
(e) each of said reinforcing rods extends between a rib on said outer concrete layer and the confronting rib on said inner concrete layer.

11. A wall panel according to claim 9 wherein said panel further includes:
(e) vertical reinforcing rods extending vertically in, and embedded in, one of said concrete layers with at least certain of said vertical reinforcing rods having portions thereof positioned proximate a portion of a transverse reinforcing rod.

12. A wall panel according to claim 9 wherein:
(e) said first and second concrete layers have a uniform constant cross section extending from top to bottom thereof over substantially the entire width of the panel.

* * * * *